United States Patent
Takahashi

(10) Patent No.: US 7,650,354 B2
(45) Date of Patent: *Jan. 19, 2010

(54) SYSTEM, METHOD, AND PROGRAM FOR CHECKING INDEX CONSISTENCY IN DATABASE

(75) Inventor: Toshikazu Takahashi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/849,246

(22) Filed: Aug. 31, 2007

(65) Prior Publication Data

US 2008/0162585 A1  Jul. 3, 2008

(30) Foreign Application Priority Data

Dec. 28, 2006  (JP) ............................. 2006-354038

(51) Int. Cl.
*G06F 17/30*  (2006.01)
(52) U.S. Cl. ........................... 707/101; 707/8; 707/203
(58) Field of Classification Search ....................... None
See application file for complete search history.

(56) References Cited

U.S. PATENT DOCUMENTS

| | | | |
|---|---|---|---|
| 4,751,702 A | | 6/1988 | Beier et al. |
| 5,155,678 A | | 10/1992 | Fukumoto et al. |
| 5,778,387 A | | 7/1998 | Wilkerson et al. |
| 5,881,379 A | * | 3/1999 | Beier et al. .................. 707/101 |
| 6,052,799 A | * | 4/2000 | Li et al. .......................... 714/13 |
| 6,073,129 A | * | 6/2000 | Levine et al. ................... 707/4 |
| 6,185,569 B1 | * | 2/2001 | East et al. .................. 707/101 |
| 6,411,964 B1 | * | 6/2002 | Iyer et al. ................... 707/200 |
| 6,516,380 B2 | * | 2/2003 | Kenchammana-Hoskote et al. ............................. 711/3 |

(Continued)

FOREIGN PATENT DOCUMENTS

JP    5081110    4/1993

(Continued)

OTHER PUBLICATIONS

An effective recovery under fuzzy checkpointing in main memory databases. S.K. Woo et al. Published year 2000 in Elsevier Science B.V.*

(Continued)

*Primary Examiner*—Neveen Abel Jalil
*Assistant Examiner*—Christyann R Pulliam
(74) *Attorney, Agent, or Firm*—Sawyer Law Group

(57) ABSTRACT

The present invention provides a system, a method, and a program for checking index consistency online in a database that includes a main database storing a plurality of data segments and an index database storing a plurality of index segments. A system according to an aspect of the present invention includes a record creating unit for sequentially reading out the index segments from the index database and creating a pointer record that contains a pointer value and a key value and for sequentially reading out the data segments from the main database and create a segment record that contains a storage address and an indexed field value of an index target segment to be indexed among the read out segments, a scan point setting unit for setting scan points that indicate progress of creation of the pointer record and the segment record.

6 Claims, 8 Drawing Sheets

U.S. PATENT DOCUMENTS

| | | | |
|---|---|---|---|
| 6,792,418 B1 * | 9/2004 | Binnig et al. | 707/3 |
| 6,430,626 B1 | 8/2005 | Witkowski et al. | |
| 7,085,787 B2 * | 8/2006 | Beier et al. | 707/204 |
| 7,107,258 B2 | 9/2006 | Cheng et al. | |
| 7,133,884 B1 * | 11/2006 | Murley et al. | 707/202 |
| 7,299,249 B2 * | 11/2007 | Mori et al. | 707/201 |
| 7,440,936 B2 * | 10/2008 | Mori | 707/2 |
| 2001/0047360 A1 * | 11/2001 | Huras et al. | 707/102 |
| 2002/0091675 A1 * | 7/2002 | Shimokawa et al. | 707/1 |
| 2004/0122842 A1 * | 6/2004 | Friske et al. | 707/102 |
| 2004/0148284 A1 | 7/2004 | Baker | |
| 2005/0223043 A1 | 10/2005 | Randal et al. | |
| 2007/0118547 A1 | 5/2007 | Gupta et al. | |
| 2008/0162585 A1 * | 7/2008 | Takahashi | 707/200 |
| 2008/0313218 A1 * | 12/2008 | Takahashi | 707/102 |

FOREIGN PATENT DOCUMENTS

| | | |
|---|---|---|
| JP | 6075840 | 3/1994 |
| JP | 6139124 | 5/1994 |
| JP | 6243011 | 9/1994 |
| JP | 8249222 | 9/1996 |
| JP | 08249222 | 9/1996 |
| JP | 9006653 | 1/1997 |
| JP | 10312329 | 11/1998 |
| JP | 2001142765 | 5/2001 |
| JP | 2004013228 | 1/2004 |
| JP | 2005190047 | 7/2005 |
| JP | 2006139619 | 6/2006 |

OTHER PUBLICATIONS

Vibby Gottemukkala et al. Relaxed Index Consistency for a Client-Server Database. IEEE 1996.*

Data Blocks, Extents, and Segments. Oracle Database Concepts. Copyright Oracle Corp. 2003.*

IBM, "IBM IMS High Performance Pointer Checker for z/OS," User Guide vol. 1, Version 2 Release 1, First Addition (Jun. 2003), Copyright International Business Machines Corporation, 302 pages.

Office Action from U.S. Appl. No. 11/268,910 dated Apr. 16, 2008.

Notice of Allowance from U.S. Appl. No. 2/180,492 dated Apr. 28, 2009.

* cited by examiner

FIG. 7

| POINTER VALUE (74) | KEY VALUE (76) |
|---|---|
| RBA1 | A |
| RBA2 | B |
| RBA3 | C |
| ⋮ | ⋮ |

POINTER RECORD 70

FIG. 8

| STORAGE ADDRESS (84) | INDEXED FIELD VALUE (86) |
|---|---|
| RBA1 | A |
| RBA2 | B |
| RBA3 | C |
| ⋮ | ⋮ |

SEGMENT RECORD 80

FIG. 9

| LOG NUMBER (92) | SEGMENT ID (94) | PRE-UPDATE PREFIX PART (96) | POST-UPDATE PREFIX PART (98) |
|---|---|---|---|
| 1 | | | |
| 2 | | | |
| 3 | | | |
| ⋮ | ⋮ | ⋮ | ⋮ |

UPDATE LOG FOR INDEX SEGMENT 90

FIG. 10

| LOG NUMBER (102) | SEGMENT ID (104) | LOG TYPE (106) | PRE-UPDATE PREFIX PART (108) | POST-UPDATE PREFIX PART (110) | INDEXED FIELD VALUE (112) |
|---|---|---|---|---|---|
| 1 | | TYPE 1 | | | |
| 2 | | TYPE 2 | | | N/A |
| 3 | | TYPE 3 | N/A | N/A | |
| ⋮ | ⋮ | ⋮ | ⋮ | ⋮ | ⋮ |

UPDATE LOG FOR INDEX TARGET SEGMENT 100

FIG. 11

| LOG NUMBER | SEGMENT ID | PRE-UPDATE PREFIX PART | POST-UPDATE PREFIX PART |
|---|---|---|---|
| 1 | A | 1000 | Null |
| 2 | A | Null | 7000 |
| 3 | B | 7000 | Null |
| 4 | B' | Null | 7000 |
| ⋮ | ⋮ | ⋮ | ⋮ |

UPDATE LOG FOR INDEX SEGMENT 90

| LOG NUMBER | SEGMENT ID | LOG TYPE | PRE-UPDATE PREFIX PART | POST-UPDATE PREFIX PART | INDEXED FIELD VALUE |
|---|---|---|---|---|---|
| 1 | 1000 | TYPE 1 | ABC | Null | N/A |
| 2 | 7000 | TYPE 2 | Null | XYZ | B |
| 3 | 7000 | TYPE 3 | N/A | N/A | B' |
| ⋮ | ⋮ | ⋮ | ⋮ | ⋮ | ⋮ |

UPDATE LOG FOR INDEX TARGET SEGMENT 100

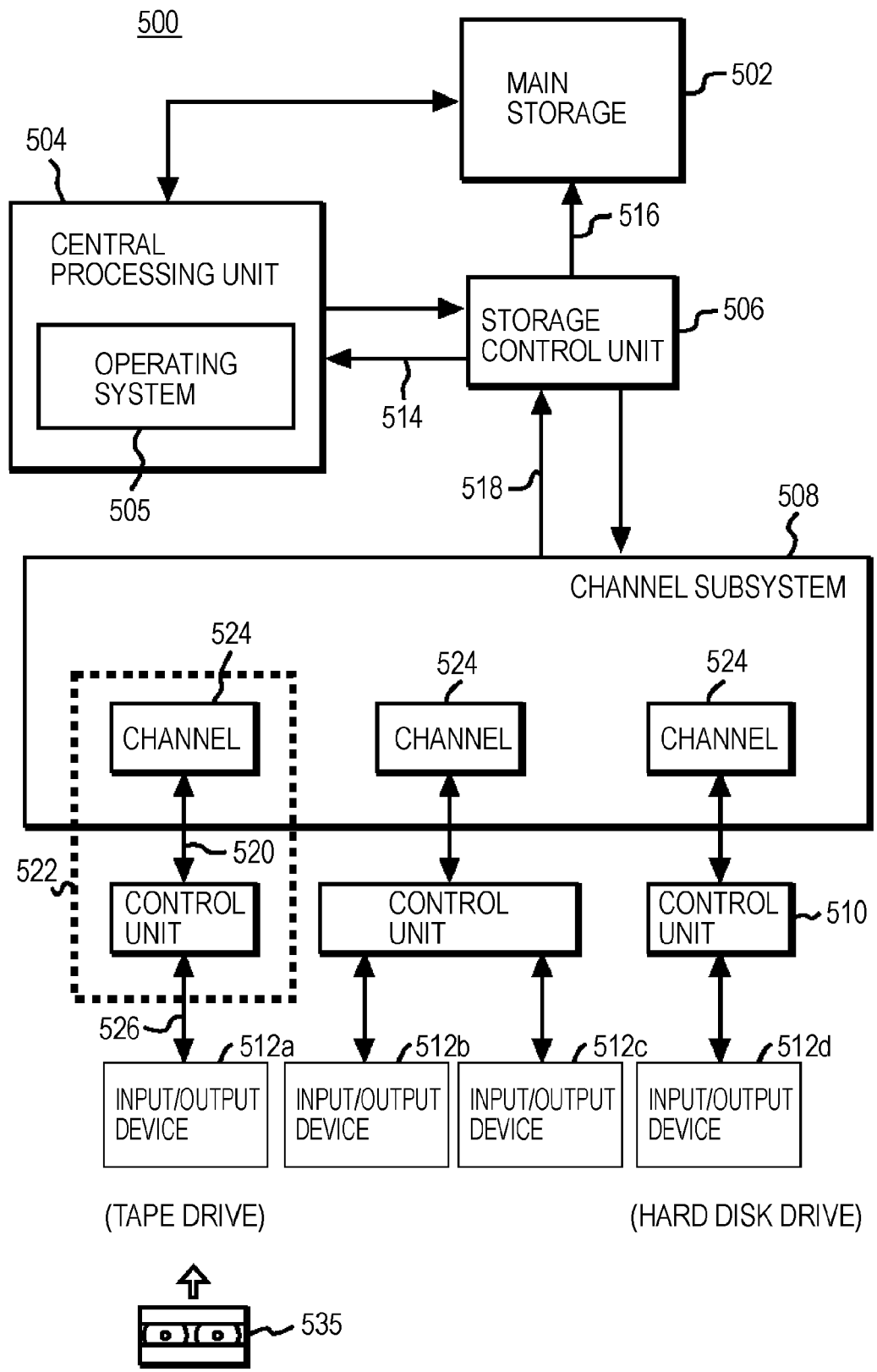

SYSTEM, METHOD, AND PROGRAM FOR CHECKING INDEX CONSISTENCY IN DATABASE

CROSS-REFERENCE TO RELATED APPLICATIONS

This application claims the right to foreign priority benefits under Title 35, United States Code Section 119 to Japanese Patent Application No. 2006-354038, filed Dec. 28, 2006, all of which is incorporated herein by reference.

TECHNICAL FIELD

The present invention relates to a system, a method, and a program for checking consistency in database. In particular, the present invention relates to a system, a method, and a program for checking index consistency online in a database that includes a main database storing a plurality of data segments and an index database storing a plurality of index segments.

BACKGROUND ART

Hitherto, a check of database consistency has been performed by comparing a storage address of each segment contained in a database with each pointer value contained in the database. Such a consistency check is implemented and employed in, for example, a database management system developed by the assignee of this application (see, IMS High Performance Pointer Checker User's Guide, which may be viewed on the World Wide Web page at URL publibfi.boulder.ibm.com/cgi-bin/bookmgr/BOOKS/fabp1 b10/ CONTENTS.

In the above-described consistency check, if the database is updated before completion of reading out all of pointers, an accurate check would not be performed because addresses are compared with pointers which includes both pre-update and post-update pointers. Accordingly, it has been common to halt updating a database or to perform exclusive access control for at least a part of the database during the consistency check processing (see, for example, Japanese Patent Application Publication No. 8-249222).

However, when the data size of the database is large, the update is halted for a vast amount of time or the update is significantly delayed, which may reduce user's convenience. Accordingly, there have been suggested techniques for checking the consistency without halting the update (see, Japanese Unexamined Patent Patent Application Publication No. 2001-142765 and Japanese Unexamined Patent Application Publication No. 2006-139619).

Meanwhile, when a database grows large, a problem regarding a longer retrieval time occurs in addition to the above-described problem regarding the update. However, this can be solved by indexing. For example, information Management System (IMS) provides by International Business Machines Corporation (IBM), which is a hierarchical database, realizes the indexing by providing an index database storing indexes to data segments in addition to a main database storing the data segments.

Each index includes a pointer that points a storage address of the corresponding data segment in the main database and a key value used for retrieving. From a standpoint of database consistency, the consistency also needs to be checked regularly regarding the pointers and the key values included in these indexes. Desirably, such an index consistency check is also executed online, that is, without halting update of a database.

SUMMARY OF THE INVENTION

Accordingly, an object of the present invention is to provide a system, a method, and a program for checking index consistency online in a database that includes a main database storing a plurality of data segments and an index database storing a plurality of index segments.

According to a first aspect of the present invention, a system for checking index consistency in a database that includes a main database storing a plurality of data segments and an index database storing a plurality of index segments is provided. The system includes a record creating unit configured to create a pointer record that contains pointer values and key values by sequentially reading out the index segments from the index database and to create a segment record that contains storage addresses and indexed field values of index target segments to be indexed by sequentially reading out the data segments from the main database, a scan point settling unit configured to set scan points that indicate points up to which the creation of the pointer record and the segment record proceeds, respectively, an update log writing unit configured to write, in response to the update of an index segment in the index database or the update of an index target segment in the main database, an update log of the updated segment on condition that the updated segment is located at a point that precedes the scan point set by the scan point setting unit, a record modifying unit configured to modify the pointer record and the segment record on the basis of the update log, and a consistency verifying unit configured to verify index consistency by comparing record entries of the modified pointer record with corresponding record entries in the modified segment record.

According to a second aspect of the present invention, a method for checking index consistency in a database that includes a main database storing a plurality of data segments and an index database storing a plurality of index segments is provided. The method includes the steps of creating a pointer record that contains pointer values and key values by sequentially reading out the index segments from the index database, creating a segment record that contains storage addresses and indexed field values of index target segments indicated by the pointer values of the index segments by sequentially reading out the data segments from the main database, setting scan points that indicate points up to which the creation of the pointer record and the segment record proceeds, respectively, writing, in response to the update of an index segment in the index database or the update of an index target segment in the main database, an update log of the updated segment on condition that the updated segment is located at a point that precedes that scan point set at the step of setting the scan points, modifying the pointer record and the segment record on the basis of the update log, and verifying index consistency by comparing record entries of the modified pointer record with corresponding record entries of the modified segment record.

According to a third aspect of the present invention, a program for checking index consistency in a database that includes a main database storing a plurality of data segments and an index database storing a plurality of index segments, which causes a computer to execute each step of the method according to the second aspect, is provided.

In any one of the aspects, the main database and the index database may be the same database. That is the data segments and the index segments may be recorded in a single database.

BRIEF DESCRIPTION OF THE DRAWINGS

FIG. 7 is a diagram showing an example of a pointer record created by a record creating unit of the database management system according to the embodiment of the present invention.

FIG. 8 is a diagram showing an example of a segment record created by the record creating unit of the database management system according to the embodiment of the present invention.

FIG. 9 is a diagram showing an example of an update log for index segments written by an update log writing unit of the database management system according to the embodiment of the present invention.

FIG. 10 is a diagram showing an example of an update log for index target segments written by the update log writing unit of the database management system according to the embodiment of the present invention.

FIG. 11 is a diagram showing specific examples of the updated log for index segments and the update log for index target segments written by the update log writing unit of the database management system according to the embodiment of the present invention.

FIG. 12 is a block diagram showing an example of a hardware configuration of an information processing apparatus for functioning as the database management system according to the embodiment of the present invention.

BEST MODE FOR CARRYING OUT THE INVENTION

The best mode for carrying out the invention will be described below with reference to the drawings. However, the description given below is illustrative only, and does not limit the present invention described in the appended claims. For example, although IMS of IBM Corporation is used as an example of a database in embodiments, the present invention can be also applied to other databases.

Figure 1:
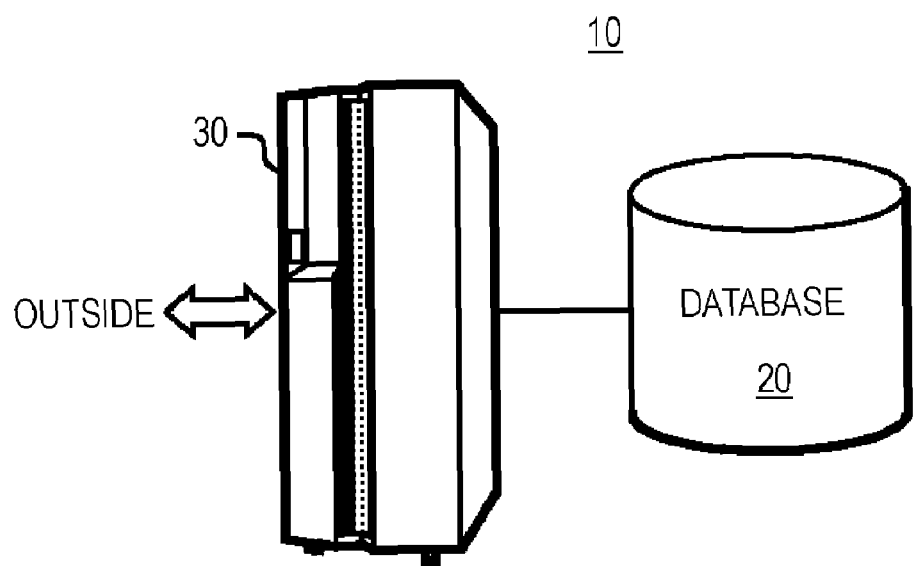
FIG. 1 is a diagram showing an overview of a database system intended by the present invention.
Figure 2:
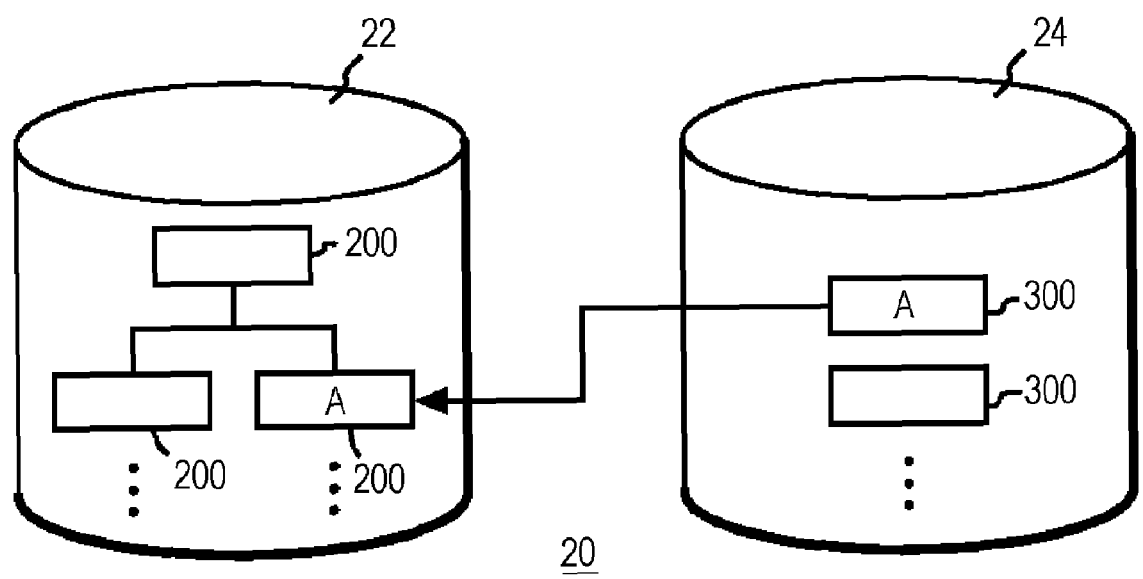
FIG. 2 is a diagram showing a database constituted by a main database and an index database.

FIG. 1 shows an overview of a database system 10 intended by the present invention. The database system 10 includes a database 20 and a database management system 30. In the present embodiment, the database 20 is a hierarchical database. As shown in FIG. 2, the database 20 is constituted by a main database 22 for storing a plurality of data segments 200 in a tree structure and an index database 24 for storing a plurality of index segments 300. Each index segment includes a key value (an index) for a corresponding data segment. In FIG. 2, for example, an index segment 300 having a key value A corresponds to a data segment 200 having a value A in its indexed field. The same goes for other index segments.

The main database 22 and the index database 24 may be the same database. That is, the data segments 200 and the index segments 300 may be recorded in a single database.

Figure 3:
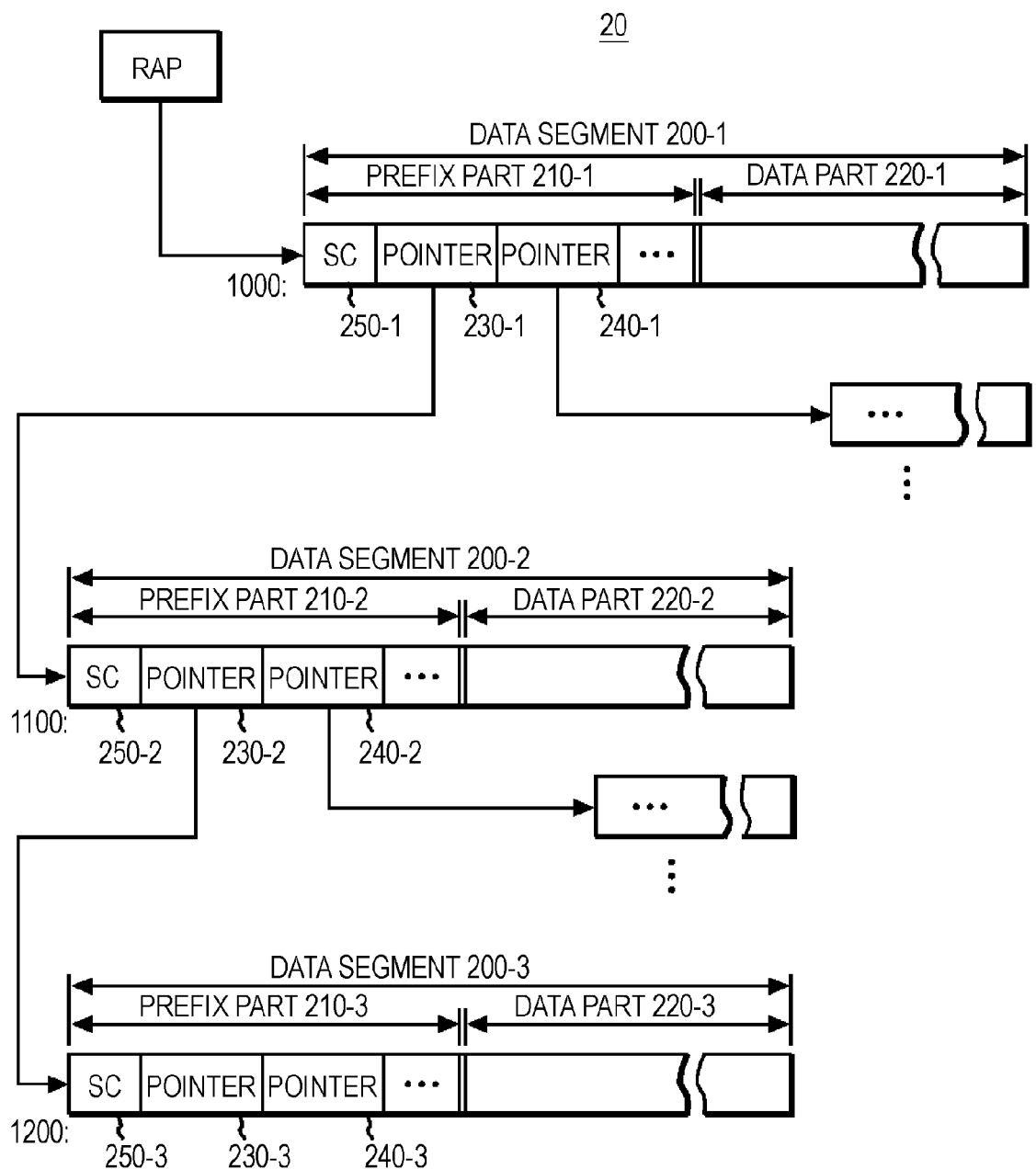
FIG. 3 is a block diagram showing an example of a specific structure of the main database.

FIG. 3 shows an example of a specific configuration of the main database 22. The main database 22 stores a plurality of data segments represented by data segments 200-1 to 200-3. In the illustrated example, the data segment 200-1 serves as a root segment, and can be designated with a root anchor point (RAP). The data segment 200-1 contains a prefix part 210-1 and a data part 220-1. In addition, a storage address of the data segment 200-1 is 1000. Here, the storage address means, for example, a location of a starting address (a relative byte address: RBA) of the data segment 200-1 relative to a predetermined reference address or origin address of the main database 22. The prefix part 210-1 includes a pointer 230-1 that points a storage address 1100 of the data segment 200-2, a pointer 240-1 that points a storage address of another data segment, and a segment code (SC) 250-1. The segment code 250-1 is a number assigned sequentially from the root segment in order to identify a segment type. In the illustrated example, the segment code 250-1 is set to, for example, "1" since the data segment 200-1 is the root segment.

As in the case of the data segment 200-1, the data segment 200-2 contains a prefix part 210-2 and a data part 220-2. The prefix part 210-2 includes a pointer 230-2 that points a storage address 1200 of the data segment 200-3, a pointer 240-2 that points a storage address of still another data segment, and a segment code 250-2. The segment code 250-2 is set to, for example, "02" since the data segment 200-2 is a segment following the root segment.

The data segment 200-3 also contains a prefix part 210-3 and a data part 220-3. The data segment 200-3 is located at a terminal of a series of hierarchical segments that starts from the data segment 200-1. Accordingly, the prefix part 210-3 does not have a pointer for pointing a lower-layer segment but has only pointers for pointing sibling segments having the same parent segment. In practice, the prefix part 210-3 may include predetermined data indicating no address (for example, Null) as the pointer 240-3. In addition, a segment code 250-3 of the prefix part 210-3 is set to, for example, "03".

As described above, the main database 22 has a hierarchical structure that enables data segments to be sequentially accessed by trailing the pointer recorded in the prefix part of each data segment. Although not shown in FIG. 3, the data part 220 of each data segment 200 contains a plurality of fields. In IMS, at least one of these fields can be specified as an indexed field.

Figure 4:
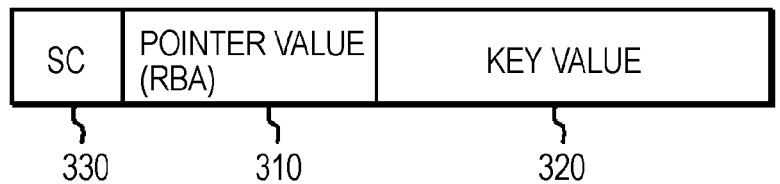
FIG. 4 is a diagram showing a format of an index segment recorded in the index database.

The index database 24 simply stores index segments 300 in a format shown in FIG. 4, and does not employ a hierarchical structure. The illustrated index segment 300 contains a pointer value (for example, an RBA) 310 that points a storage address of a corresponding data segment, a key value 320 for retrieving the corresponding data segment, and a segment code (SC) 330. A value of a given indexed field in the corresponding data segment is used as the key value 320. For example, in the case where there is a name field in a data segment in which a name "SMITH" is written and it is desirable to use this name as a key for indexing, "SMITH" may be used as the key value 320. However, a value to be actually recorded as the key value 320 is a hexadecimal coded value of "SMITH". For example, in the case of an extended binary coded decimal interchange code (EBCDIC) employed in a mainframe, "SMITH" is represented as "XE2D4C9E3C8". The segment code 330 contains a code value assigned to the root segment for convenience, for example, "01". In the index segment 300, the pointer value 310 and the segment code 330 constitute a prefix part, while the key value 320 constitutes a data part.

Figure 5:
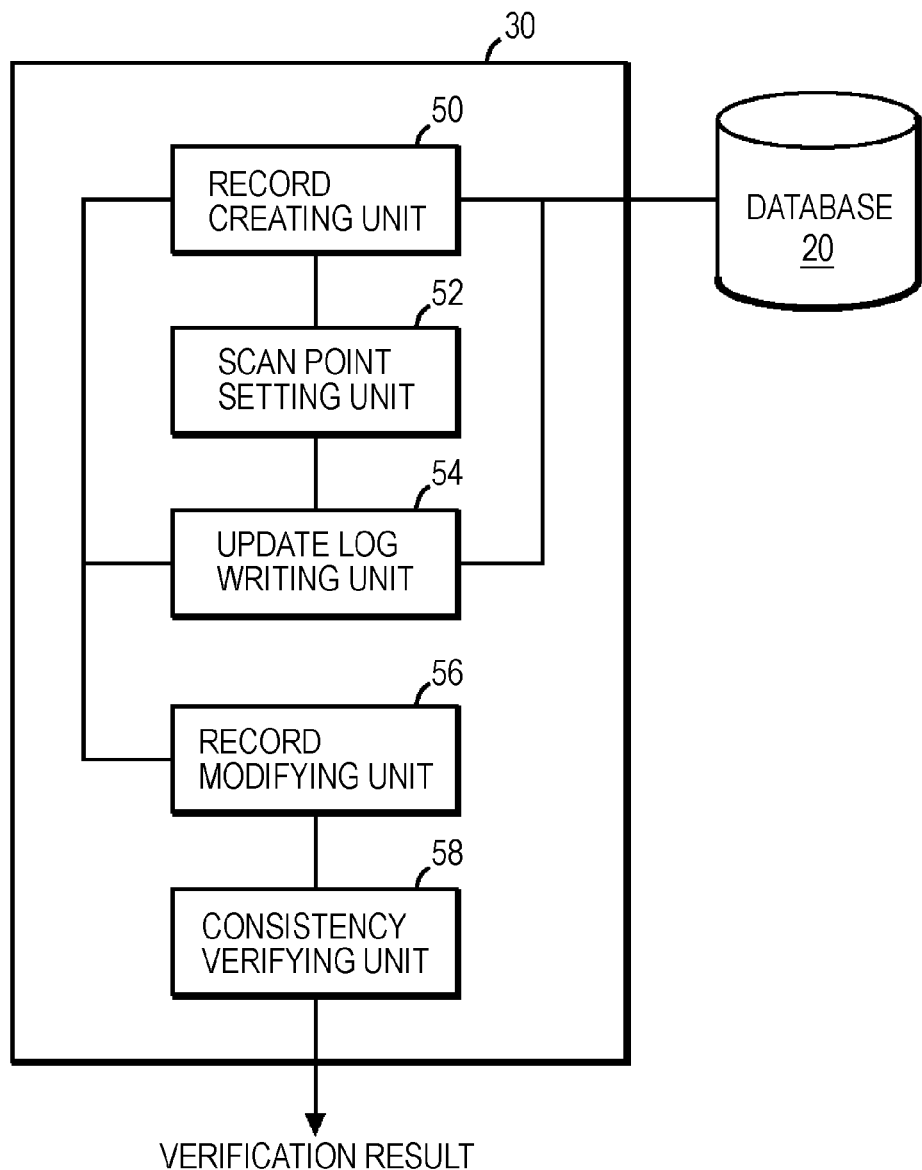
FIG. 5 is a block diagram showing an example of a functional configuration of a database management system according to the embodiment of the present invention.

Next, FIG. 5 shows an example of a functional configuration of the database management system 30 according to the present invention. The illustrated database management system 30 includes a record creating unit 50, a scan point setting unit 52, an update log writing unit 54, a record modifying unit 56, and a consistency verifying unit 58. The record creating unit 50 sequentially reads out index segments 300 from the index database 24, and creates a pointer record that contains pointer values and key values. Furthermore, the record creating unit 50 sequentially reads out data segments from the main database 22, and creates a segment record that contains storage addresses and indexed field values of data segments to be indexed (index target segments) among the read out data segments. In this embodiment, indexing of a data segment is performed by specifying a segment code. Accordingly, it is possible to determine whether the read out data segment is an index target segment by checking the segment code 250 contained in the prefix part 210 of the data segment read out from the main data base 22.

The scan point setting unit 52 sets scan points that indicate points up to which the creation of the pointer record and the segment record performed by the record creating unit 50 proceeds, respectively. This can be realized by, for example, holding an addresses of a segment read out by the record creating unit 50 and updating the address in an ascending order in accordance with the readout. However, for the index segments, since they are not always arranged in fixed locations (RBAs) in the index database 24, it is preferable to set the key value as the scan point instead of the address. Needless to say, if the locations of the index segments are fixed, the addresses can be set as the scan point.

The update log writing unit 54 writes, in response to update of an index segment in the index database 24 or update of an index target segment in the main database 22, an update log of the updated segment on condition that the updated segment is located at a point that precedes the scan point set by the scan point setting unit. That is, if a segment already read out by the record creating unit 50 for the consistency check is updated, the update log writing unit 54 writes the updates log of the updated segment.

The record modifying unit 56 modifies the pointer record and the segment record created by the record creating unit 50 on the basis of the update log written by the update log writing unit 54. The consistency verifying unit 58 verifies the index consistency by comparing record entries of the modified pointer record with corresponding record entries of the modified segment record. The consistency verifying unit 58 then outputs the verification result.

Figure 6:
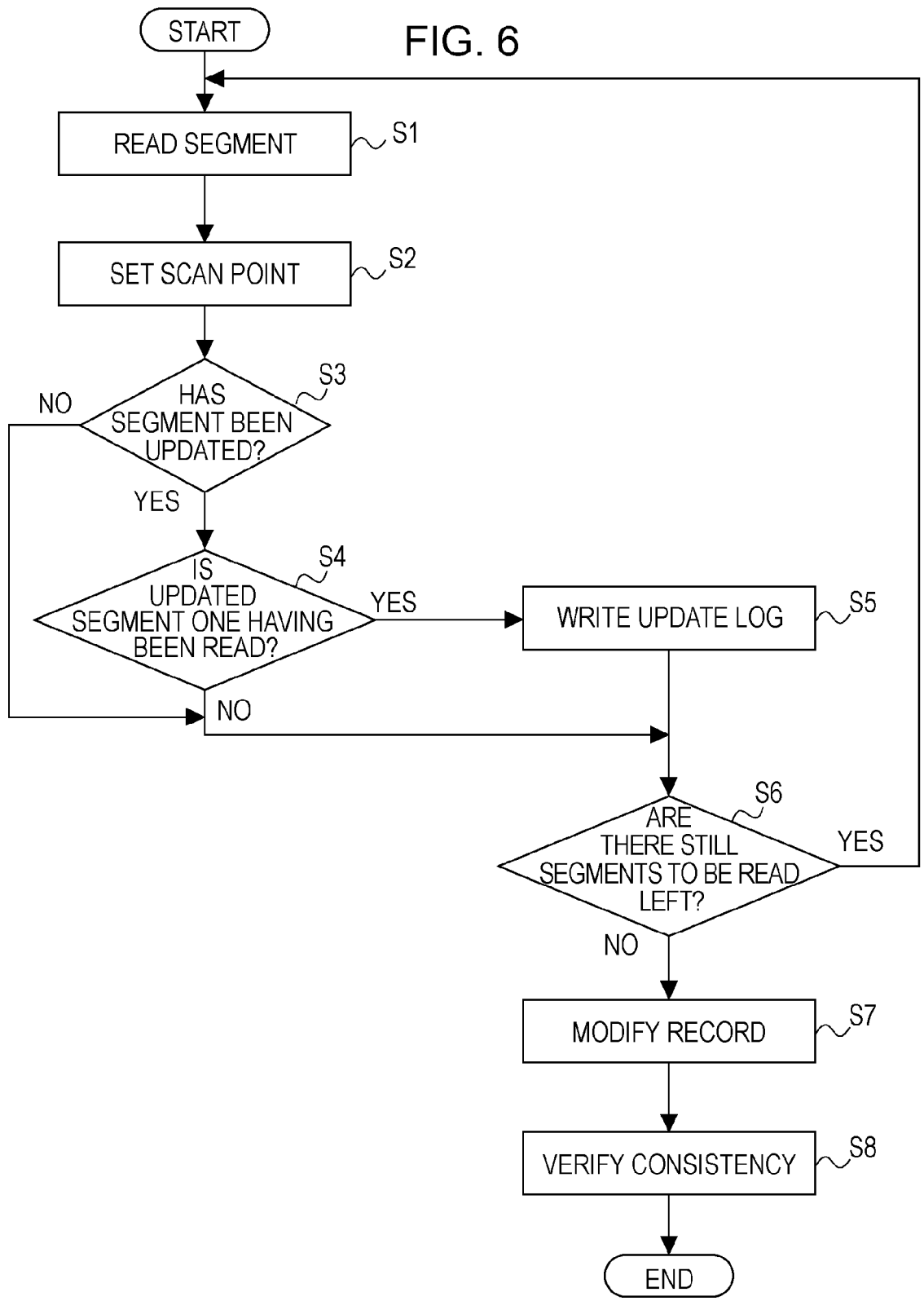
FIG. 6 is a flowchart showing an operation of the database management system according to the embodiment of the present invention.

Referring next to a flowchart of FIG. 6, an operation of the database management system 30 shown in FIG. 5 will be described. At the first step S1, the record creating unit 50 of the database management system 30 locks and reads out data segments and index segments from the main database 22 and the index database 24, respectively, and creates a segment record and a pointer record, respectively. At this time the entire database is not locked, but only a specific address to be read out is locked.

FIG. 7 shows an example of a structure of a pointer record. As shown in FIG. 7, a pointer record 70 has two fields 74 and 76 for holding pointer values and key values, respectively. The pointer value field 74 and the key value field 76 hold the respective values included in the read out index.

FIG. 8 shows an example of a structure of a segment record. As shown in FIG. 8, a segment record 80 includes two fields 84 and 86 for holding storage addresses and indexed field values, respectively. Each of the storage addresses 84 has a starting address from which the read out data segment has been stored. In this embodiment, an RBA is used as the storage address. As described above, each of the indexed field values 86 is value of a field that is specified as the indexed field in the data part 220 of the data segment.

In FIGS. 7 and 8, the same characters are used in the record entries for ease of explanation. However, in practice, a storage address RBA1 and a pointer value RBA1 are not necessarily the same, for example. Likewise, an indexed field value A and a key value A are not necessarily the same. The same applies to other values.

Referring back to FIG. 6, at the next step S2, the scan point setting unit 52 of the database management system 30 sets a storage address of a data segment and a key value of an index segment read out by the record creating unit 50 as the scan points for the respective databases. These scan points are sequentially updated every time a data segment and an index segment are read out.

At the next step S3, the update log writing unit 54 of the database management system 30 checks whether a data segment or an index segment is updated in the database 20. If a data segment or an index segment is updated, the update log writing unit 54 determines whether the address (or the key value) of the updated segment precedes the current scan point, that is, whether a segment that has been read out at step S1 is updated. If the read out segment is updated, the process proceeds to step S5. Otherwise, the process proceeds to step S6.

At step S5, the update log writing unit 54 writes the update log of the updated segment. FIGS. 9 and 10 show examples of structures of an update log for index segments and an update log for index target segments, respectively. Referring to FIG. 9, an update log for index segments 90 has four fields 92-98 including log numbers, segment IDs, pre-update prefix parts, and post-update prefix parts, respectively. The log number may be a serial number in ascending order. The segment ID 94 may be any value as long as the value allows identification of the updated segment. Since the index segments are not necessarily arranged in fixed locations (RBAs) in the index database 24 in IMS according to the embodiment, the index segment cannot be identified with an RBA value. Instead of the RBA, since the key value is uniquely assigned in the index database 24, the index segment can be identified with this value. The pre-update prefix part 96 and the post update prefix part 98 include contents, namely, the pointer values and the segment code, of the prefix part before and after the update, respectively.

Referring to FIG. 10, an update log for index target segments 100 has six fields 102-112 including log numbers, segment IDs, log types, pre-update prefix parts, post-update prefix parts, and indexed field values. The log number 102 may be a serial number in ascending order. The segment ID 104 may be any value as long as the value allows identification of the updated index target segment. In this embodiment, since the index target segment occupies a fixed location (RBA) in the main database 22, the RBA can be employed as the segment ID. The log type 106 indicates the type of changed data held by the log. In this embodiment, three types, namely, "prefix and indexed field parts" (type 1), "prefix part only" (type 2), and "indexed field part only" (type 3), are considered. The information held in the update log differs depending on the type. The pre-update prefix part 108 and the post update prefix part 110 include contents of the index target segment before and after the update, respectively. The indexed field value 112 is a value of the indexed field of the updated index target segment. If the indexed field is updated, the updated part of the indexed field or the entity thereof is recorded. For example, if the indexed field value is updated from "ABC" to "ADE", only the updated part "DE" may be recorded in the indexed field value 112 together with a starting location of the updated part and a length of the updated part. Alternative, the entire indexed field may be recorded.

As described above, the information held in the update log differs depending on the log type. For example, an update log entry (type 1) involving addition of a segment includes the pre-update prefix part 108, the post-update prefix part 110, and the indexed field value 112. On the other had, an update log entry (type 2) involving deletion of a segment does not include the indexed field value 112 (indicated by "N/A") since only the pointer value included in the deleted segment needs to be known. An update log entry (type 3) involving the update of only the indexed field of a segment does not includes field the pre-update prefix part 108 and the post-update prefix part 110 since only the update indexed field value needs to be known.

The update log writing unit 54 adds the information to the update log every time a segment preceding the scan point is updated.

Referring back to FIG. 6, after the completion of step S5 or in the case where the determination result at step S4 is NO, the process proceeds to step S6. At step S6, it is determined whether the segments to be read out still exist in the main database 22 and the index database 24. If the segments still exist, the process returns to step S1. Otherwise, the process proceeds to step S7.

At step S7, the record modifying unit 56 of the database management system 30 modifies the pointer record 70 and the segment record 80 created by the record creating unit 50 on the basis of the update logs 90 and 100 written by the update log writing unit 54, respectively. More specifically, the record modifying unit 56 reflects the contents of the update logs 90 and 100 in the pointer record 70 and the segment record 80 one by one. For example, a case where the pointer record 70 includes an entry "pointer value=1000, key value=A", the segment record 80 includes an entry "storage address=1000, an indexed field value=A", and the update logs 90 and 100 are formed as shown in FIG. 11 will be considered.

The update logs 90 and 100 of FIG. 11 indicate the followings. Firstly, a data segment at an address 1000 and a corresponding index segment are deleted from the main database 22 and the index database 24, respectively. Next, a data segment having an indexed field value B is added at an address 7000 of the main database 22 and a corresponding segment having a key value B is also added to the index database 24. Lastly, the indexed field value is updated to b in the added data segment located at the address 7000, due to which the index segment having the key value B is deleted in the index database 24, and an index segment having a key value B' is added instead. Accordingly, firstly, the entry "pointer value=1000, key value=A" is deleted in the pointer record 70. Then, an entry "pointer value=7000, key value=B" is added and then this added entry is deleted. Lastly, an entry "pointer value=7000, key value=B" is added. In the segment record 80, the entry "storage address=1000, indexed field value=A" is deleted. Next an entry "storage address=7000, index field value=B" is added. Lastly, this entry is updated to an entry "storage address=7000, indexed field value=B". The new entry may be added by overwriting information in the deleted entry.

The indexed field value of the data segment located at the address 7000 of the main database 22 is updated only once in the example of FIG. 11. However, when this is updated a plurality of times, these updates are applied to the segment record 80 in chronological order starting from the oldest one by referring to the log number. For a corresponding index segment, deletion of an old index segment and addition of a new index segment are repeated each time the indexed field value is updated.

As described above, the record modifying unit 56 reflects the contents of the update logs 90 and 100 to the pointer record 70 and the segment record 80 after the completion of reading out of the segments from the main database 22 and the index database 24. Those skilled in the art can easily implement the modification of each record for the update other than the update example of FIG. 11 based on the above description. The update of values other than the indexed field value in the data segment will not be explained here because it does not relate to indexing, and can be handed with the conventional consistency checking techniques.

Referring back to FIG. 6, after the completion of the record modification, the consistency verifying unit 58 of the database management system 30 verifies the index consistency by comparing record entries in the modified pointer record 70 with corresponding record entries in the modified segment record 80 at step S8. More specifically, the consistency verifying unit 58 sorts the modified pointer record 70 by the pointer value (RBA), and sorts the modified segment record 80 by the storage address (RBA). The consistency verifying unit 58 determines that the consistency is kept if the key value of an entry of the pointer record 70 is the same as the indexed field value of an entry of the segment record 80 with the entries having the same RBA. Otherwise, the consistency verifying unit 58 determines that a consistency error has occurred.

FIG. 12 shows an example of a hardware configuration of an information processing apparatus 500 for functioning as the database management system 30. In FIG. 12, the hardware configuration will be described for an example where the information processing apparatus 500 is a large-scale general-purpose computer called a mainframe. The information processing apparatus 500 includes a main storage 502, at least one central processing unit 504, a storage control unit 506, a channel subsystem 508, at least one control unit 510, and at least one of input/output devices 512a to 512d.

The main storage 502 stores data and programs input from the input/output devices 512a to 512d. When addressed by the central processing unit 504 or the channel subsystem 508, the main storage 502 sends data stored in that address to the central processing unit 504 or the channel subsystem 508. The main storage 502 allows high-speed reading and writing of stored data. With this high-speed reading and writing, high-speed arithmetic operations can be performed by the central process unit 504.

The central processing unit 504 plays a main role of controlling the entire information processing apparatus 500. For example, the central processing unit 504 runs at least one operating system 505. The operating system 505 controls execution of programs and input/output processing in the information processing apparatus 500. For example, the operating system 505 may control execution of other programs running on the central processing unit 504, or may control data transfer to and from each of the input/output devices 512a to 512d.

The storage control unit 506 is connected to the central processing unit 504 through a bus 514 allowing two-way or one way communication. The storage control unit 506 is further connected to the main storage 502 through a bus 516, and to the channel subsystem 508 through a bus 518. For example, the storage control unit 506 may temporarily store an access request received from the central processing unit 504 or the channel subsystem 508 (queuing processing), and may send the access request to the main storage 502 at a given timing.

The channel subsystem 508 is connected to each of the control units 510 through a data transfer path 520. The channel subsystem 508 controls data transfer between the input/output devices 512a to 512d and the main storage 502. With this configuration, processing load for communication between the central processing unit 504 and the input/output devices 512a to 512d is reduced, which enables the arithmetic processing by the central processing unit 504 and the input/output processing by the input/output devices 512a to 512d to be executed in parallel. As a result, it is possible to operate the information processing apparatus 500 efficiently.

In additional, the channel subsystem 508 performs data transfer to and from the input/output devices 512a to 512d through at least one of channel paths 522. Each channel path 522 includes a channel 524 provided in the channel subsystem 508. In addition, each channel path 522 includes at least one control unit 510 and a data transfer paths 520. Here, the data transfer path 520 may be an ESCON (Enterprise System Connection Architecture) based serial link. Alternatively, the data transfer path 520 may be a parallel OEMI or a fiber channel.

The control unit 510 controls at least one of the input/output devices 512a to 512d. For example, control unit 510 may control the timing of data transfer in each of the input/output devices 512a to 512d. The control unit 510 is connected to at least one of the input/output devices 512a to 512d through a bus 526. As an example, the control unit 510 can be connected with up to 256 input/output devices.

Each of the input/output devices 512a to 512d transfers data to or from the main storage 502 through to control unit 510, the channel subsystem 508, and the storage control unit 506. In this configuration, the input/output device 512a is a magnetic tape drive and the input/output device 512d is a hard disk drive. Alternatively or additionally, each of the input/output devices 512a to 512d may be a punched-card reader, a display, a keyboard, a printer, a communication device, various types of sensors, or any other storage device. As an example, at least one of the input/output devices 512a to 512d may be connected to and access the database 20.

The program of the present invention provided to the information processing apparatus 500 may be stored in a tape recording medium 535 or other recording medium, and provided by a user. The program is read by the input/output device 512a and stored into the main storage 502 through the channel subsystem 508. Then, the program stored in the main storage 502 is installed into the input/output device 512d (a hard disk drive) though the channel subsystem 508. Since the operations that the program cause the information processing apparatus 500 or the like to perform are the same as those in the database management system 30 described with reference to FIG. 1 to FIG. 11, the description thereof is omitted.

The program described above may be stored in an external storage medium. The storage medium may be a flexible disk, a CD-ROM, an optical recording medium such as a DVD or a PD, a magneto-optical recording medium such as an MD, or a semiconductor memory such as an IC card. Alternatively, a storage device such as a hard disk drive or a RAM provided in a server system connected to a private communication network or the Internet may be used as recording medium, from which the program may be provided to the information processing apparatus 500 through the network.

While the present invention has been described with references to the preferred embodiments, the technical scope of the present invention is not limited thereto. It is to be understood by those skilled in the art that various modifications or improvements can be added to the above preferred embodiments. It is apparent from the appended claims that such modified or improved implementations fall within the technical scope of the presentation.

What is claimed is:

1. A system for checking index consistency in a database that includes a main database storing a plurality of data segments and an index database storing a plurality of index segments, the system comprising:
    a computer having a storage unit and a central processing unit, the storage unit providing storage for the main database and the index database and a central processing unit; and
    a program product for execution on the central processing unit and stored on the storage unit, the program product comprising
        a record creating unit configured to create a pointer record that contains pointer values and key values by sequentially reading out the index segments from the index database and to create a segment record that contains storage addresses and indexed field values of index target segments to be indexed by sequentially reading out the data segments from the main database;
        a scan point setting unit configured to set scan points that indicate points up to which the creation of the pointer record and the segment record proceeds;
        an update log writing unit configured to write, in response to the update of an index segment in the index database or the update of an index target segment in the main database, an update log of the updated segment on condition that the updated segment is located at a point that precedes the scan point set by the scan point setting unit, while the record generating unit is generating the pointer record or segment record;
        a record modifying unit configured to modify the pointer record and the segment record on the basis of the update log, after the record generating unit has generated the pointer record or segment record; and
        a consistency verifying unit configured to verify index consistency by
            sorting the modified pointer record by the pointer value and the modified segment record by the storage address;
            comparing record entries of the modified pointer record with corresponding record entries of the modified segment record; and
            if the key value of an entry of the pointer record is the same as the indexed field value of an entry of the segment record with the entries having the same value for the pointer value and the storage address, determining that a consistency error has occurred, and otherwise
            determining that the consistency is kept.

2. The system according to claim 1, wherein the index target segment includes a segment code and an indexed field, and the index segment includes a segment code, a pointer value of a corresponding index target segment, and a key value for indexing.

3. The system according to claim 2, wherein the record creating unit determines whether the read out data segment is the index target segment on the basis of the segment code of the data segment.

4. The system according to claim 1, wherein the scan point setting unit sets, as the scan points, the storage address of the index target segment read out by the record creating unit and the key value contained in the index segment read out by the record creating unit.

5. The system according to claim 1, wherein the update log writing the unit records, in the case where the indexed field of the index target segment is updated, information indicating the updated part and the order of the update in the update log.

6. The system according to claim 5, wherein the record modifying unit applies, in the case where the indexed field of the index target segment is updated, the update to the segment record according to the information indicating the order of the update.

* * * * *